Patented Aug. 8, 1950

2,518,211

UNITED STATES PATENT OFFICE 2,518,211

CARBON BLACK

William Bryan Wiegand, Old Greenwich, Conn., and Carl William Sweitzer, Garden City, N. Y., assignors to Columbian Carbon Company, New York, N. Y., a corporation of Delaware No Drawing. Application January 28, 1946, Serial No. 643,968

2 Claims. (Cl. 23—314)

The present invention relates to carbon blacks, and more particularly to carbon blacks of the class known as furnace blacks. The invention provides an improved process whereby furnace blacks in finely divided form may be readily converted into beads or pellets capable of being subjected to normal handling incident to their storage, shipment and use without material breakage or dusting.

Essential characteristics of carbon blacks which render them particularly valuable in various industries are their extremely fine state of subdivision and their susceptibility to uniform dispersion in the media in which they are used, rubber for instance.

Carbon blacks as manufactured are such very light, fine powders that normally about 10 pounds or less have a volume of 1 cubic foot. Such light, bulky material is expensive to pack, ship and store, and handling of the light powder causes it to fly into the air to such an extent that there is not only substantial loss of material, but great annoyance to workmen breathing the dusty air.

To avoid this difficulty, it has previously been proposed to form the finely divided black into small beads or pellets which may be subjected to ordinary handling without breakage or dusting, but which, under conditions of use, for instance in the milling of rubber, are readily reconverted into the finely divided form susceptible to uniform dispersion in the rubber. The carbon black in bead form has the further advantage of being relatively free flowing.

Various methods have been proposed for pelleting carbon black. One method which has been used with particular advantage, especially in the pelleting of channel or impingement carbon black, is that described in Reissue Patent 21,379 of March 5, 1940, granted on an application of H. J. Glaxner. In accordance with that disclosure the carbon black is admixed with a limited amount of water to form a relatively heavy doughy mass and the mass progressively advanced through an elongated path while subjected to a multiplicity of impacts caused by agitation.

In view of the large amounts of carbon black used in certain industries, notably in the rubber industry, it is desirable to ship the carbon black in bulk in tank cars, and to handle the carbon black by conventional mechanical conveyors, gravity conveyors and the like. Such shipment and handling requires that the carbon black pellets be capable of withstanding very considerable pressure without material crushing or loss of their free flowing characteristics. Pellets of furnace black formed by conventional methods without the use of a binder have generally been of insufficient strength to resist objectionable compression or matting together with loss of their free flowing characteristics, under such conditions.

It is a fact that pellets produced from furnace blacks by conventional methods have much less resistance to such compression and matting together than pellets similarly produced from impingement or channel blacks.

The carbon blacks herein referred to as impingement blacks are those which are made by burning a hydrocarbon in a zone to which there is supplied an amount of air insufficient for complete combustion of the hydrocarbon and causing the resultant flame to impinge upon a metallic surface upon which the black is deposited and from which it is collected. It is customary to use channel iron as the depositing surface, hence the name channel blacks.

As distinguished from impingement blacks, the blacks herein designated furnace blacks are made by burning a hydrocarbon in a chamber or furnace with an amount of air insufficient for complete combustion, and separating the carbon black from the furnace effluent gases. This general classification of furnace blacks as used herein also includes blacks formed by thermally decomposing a hydrocarbon by admixing it with hot gases or passing it in contact with highly heated surfaces.

The designation "furnace blacks," as used herein and in the accompanying claims, is intended to include all blacks of the type produced by such furnace methods, not excluding the so-called lamp blacks.

The characteristics of these two types of carbon blacks, i. e. impingement blacks and furnace blacks, differ in a number of respects, one of which is their capacity to be formed into pellets or beads, by conventional methods, capable of retaining their free-flowing characteristics under pressure.

Our work has indicated that there are three basic properties of carbon blacks which influence the characteristics of the beads produced therefrom. These properties are (1) particle size, (2) oiliness, and (3) a property which we have herein designated "structure." Other characteristics of the black being equal, the ability of the carbon black beads to withstand compression without crushing or loss of their free-flowing characteristics generally increases with (1) a decrease in particle size of the carbon black, (2) a reduced "structure" of the carbon black, and (3) increased oiliness.

As compared with impingement carbon blacks, the furnace blacks are generally of larger particle size, and have greater structure and oiliness.

This so-called "structure" characteristic of the black appears to be due to a linking together of the carbon particles in pairs or chains of greater or less length and complexity. The tenacity with which these carbon black particles are held together is subject to considerable variation, as indicated by the ease with which the "structure" may be destroyed or materially reduced.

This "structure" of a carbon black, where present, may be observed by use of the electron microscope. Furnace carbon blacks normally have relatively more "structure" than impingement blacks, and this coupled with their larger particle size appears to be largely responsible for their resistance to the formation of beads which will satisfactorily retain their free-flowing characteristics under relatively high pressures.

As just noted, the persistence of "structure" varies decidedly, so much so that there appear to be two different types of "structure," one type which may be destroyed by extremely vigorous working under certain conditions, and the other which persists even after the black has been incorporated in rubber compositions and the compositions subjected to the customary vigorous milling. The first type of structure may be designated "fragile structure" and the second type of structure may be designated "persistent structure."

Both types of "structure" may be present in a single furnace black as originally produced. As previously noted, the total "structure" may be observed by examination of the black by means of the electron microscope. The "persistent structure," as distinguished from "fragile structure," may likewise be observed by examination, by means of the electron microscope, of a microtome section of the rubber composition into which the black has been milled.

While we cannot state with certainty that the more highly developed "structure" of the furnace blacks is responsible for the matting together of the pellets produced therefrom when subjected to these high pressure conditions, it is our present belief that this characteristic, together with their larger particle size, is in part, at least, responsible for this inability of furnace carbon black pellets to retain free-flowing characteristics under the above-described conditions. However, we do not intend to be bound by our present theory.

Regardless of the reason for their adverse pelleting characteristics, we have found that if the furnace blacks are subjected to a vigorous working, of the type hereinafter more fully described, prior to subjection to the pelleting operation, these blacks can thereafter, by conventional pelleting operations, readily be formed into free-flowing pellets or beads which will retain their free-flowing characteristics under high pressure conditions of shipment and handling, such as previously described.

In accordance with our present invention, these furnace blacks are subjected to a preliminary working of a kind which exerts on the black a shearing action under pressure created by the continuous grinding contact of extended surfaces, as distinguished from a mere vigorous stirring or beating. The necessary shearing action is accomplished in accordance with the present invention by uniformly wetting the black with only sufficient water to form a moist, loamy mass of such consistency that it will not flow under its own weight but will cohere when pressed or squeezed, and thereafter subjecting the mass in this condition to a shearing action under considerable pressure.

The amount of water to be added to any particular furnace black to give such consistency will vary somewhat with the characteristics of the particular black, including its absorptive characteristics and its particle size. Accordingly no precise proportion of water can be specified which will be generally applicable to all furnace blacks. One must be guided by the resultant characteristics of the mass in each instance, but generally the weight of water used in accordance with our present invention in this preliminary working is about ½ to 1½ times, but preferably not exceeding, the weight of the dry carbon black.

The amount of water normally required for pelleting the black by the conventional, so-called wet, method usually does not exceed in weight about that of the dry carbon black. It will be understood that where the amount of water used in our preliminary working is less than that required for pelleting, the required amount of additional water will be added subsequent to our preliminary working. Also should the amount of water used in our preliminary working exceed that required in the pelleting operation, the latter may be carried out under conditions designed to eliminate the excess water.

Various methods of working may be used to subject the moist, loamy mass of carbon black and water to the necessary shearing action under pressure created by the continuous grinding contact of extended surfaces. The mass, for example, may be worked in a mixer, such as a dough mixer of the Banbury type, or subjected to milling as by a roller-type grinder, or it may be extruded under high pressure through conventional screw-type extrusion apparatus. We have obtained satisfactory results in small-scale operation by passing the mass once through an ordinary domestic meat grinder.

A dependable guide for determining the necessary extent and severity of the working is the compression characteristic of the resultant beads. A test which we have found to give reliable and consistent results may be carried out in an apparatus consisting of a ¾" I. D. glass tube about 6" long and two brass plungers having platform bases and adapted to slide into either end of the glass tube. In carrying out the test, the lower plunger is inserted in the tube, and, with the tube in an upright position, a 5-gram sample of the dried beads to be tested is placed in the tube. The second plunger is then inserted into the upper end of the tube so as to rest upon the upper surface of the bead sample. It is weighted until a total weight of 25 kilograms is applied, this being equivalent to approximately 125 pounds per square inch. The reduction in height of the bead sample under this weight is determined by measurement of the original and final heights of the column of beads, and is expressed as percentage compressibility.

We have found the results of this test to be a dependable index to the ability of carbon black beads to withstand tank car shipment and bulk handling without loss of their free-flowing characteristics. For satisfactory bulk handling, the compressibility of the bead should usually be less than 30%, and preferably should be about 25%.

Where we refer to the compressibility of the beads of carbon black in the appended claims, we mean their compressibility when subjected to the above tests.

A further dependable index to the necessary extent and severity of this preliminary working are the physical characteristics of the black after being subjected to this preliminary treatment. It has generally been observed that the resultant black is of a decidedly crumbly nature, when the working has been sufficiently severe, as distinguished from a plastic or powdery material. Further, it has been observed, particularly in small-scale operations, that there is a perceptible temperature rise in the black undergoing treatment, indicating that a considerable amount of work is being done on the black. Such temperature rise will of course depend upon the readiness with which heat can be dissipated from the black, but generally the black feels definitely warmer to the hand, and in laboratory operation where the moist black has been forced through a domestic meat grinder, we have observed temperature increases of from room temperature up to about 150° F. resulting in the visible passing off of water vapor from the moist carbon black.

No specific values of the temperature rise nor degree of crumbliness can be specified, as the extent and severity of the working will vary somewhat with the characteristics of the particular carbon black being treated, and will also depend upon the particular compressibility percentage sought to be attained.

These physical observations have, however, been found of assistance as a guide to the carrying out of the operation, but may with advantage be supplemented and checked by the previously described compressibility test of the finished beads.

The duration and severity of the shearing action under pressure necessary to obtain the desired results will vary somewhat with the characteristics of the particular furnace black and upon the severity of the handling which the pellets must withstand. We have herein described means by which optimum results under current practice are generally obtained but it will be understood that even less severe treatment of the type described will improve the properties of the resultant pellets with respect to the retention of their free-flowing characteristics.

While our present invention may be applied with advantage to any of the carbon blacks of the furnace type, it is especially applicable to furnace blacks having surface areas within the range of about 3 to 8 acres per pound. It is not necessary that the black be subjected to a predensing operation before treatment in accordance with the present invention, but it has been found that such predensing is usually desirable.

As previously noted, the high shearing working of the black, which we define in the accompanying claims as shearing action under pressure, is distinguished from the ordinary impact or agitation to which blacks have heretofore been subjected in predensing or pelleting operations. The working of the black in accordance with the present invention is essentially a low-speed shearing or grinding action. The duration of the working will depend to a considerable extent upon the severity of the shearing action resulting from the working. With a more severe shearing action the duration of the working may be somewhat decreased.

The invention will be illustrated by the following specific examples of its application:

*Example 1*

An intimate mixture was prepared from 80 grams of a loose furnace carbon black, having a surface area equivalent to about 6½ acres per pound, and 125 grams of water. The resultant mixture, which was of a moist, loamy consistency, was then fed through a hand-operated domestic meat grinder, and in this way subjected to a high shearing-grinding action under considerable pressure. The material passing from the grinder was of a crumbly nature, and while the mixture passed to the grinder was at room temperature or below, the extruded material felt definitely warm to the hand. The extruded material without further addition of water was then subjected to a conventional beading or pelleting operation consisting of a violent stirring of the carbon black until uniform, small beads were obtained. During this pelleting operation heat was applied to the carbon black to drive off excess moisture, since the black was of a type which would normally have required but 75 grams of water to effect pelleting.

The resultant beads were then dried in an oven at a temperature of about 300° F. for about an hour and thereafter subjected to the compressibility test previously described. For comparison, a sample of the identical black was pelleted in the same way but omitting the preliminary working.

The carbon black which had been subjected to the preliminary working in accordance with our present invention formed pellets having a density of 34 pounds per cubic foot and a compressibility of only 28%, while the pellets formed from the same carbon black without the preliminary treatment had a density of 30.4 pounds per cubic foot and a compressibility of 37%.

*Example 2*

80 grams of the loose carbon black used in Example 1 was intimately admixed with 60 grams of water and the resultant mixture, which formed a loose, moist, loamy mass, was then passed through the meat grinder as described in the preceding example. With the reduced proportion of water, a materially greater amount of work was done on the carbon black in passing through the meat grinder, as indicated by the perceptible laboring of the machine and a greater increase in the temperature of the machine and the extruded black. The extruded black, which was a crumbly mass, was transferred to a pelleting operation, such as previously described, during which operation 15 grams of additional water was added. The resultant beads were dried in an oven for an hour at a temperature of about 220° F. As in Example 1, an identical sample of carbon black was pelleted without the preliminary working for comparative purposes.

The pellets produced from the carbon black which had been treated in accordance with our present invention had a density of 37.5 pounds per cubic foot and a compressibility of only 21.9%, while the control sample had a density of 30.4 and a compressibility of 37%.

*Example 3*

100 grams of a different loose furnace carbon black, which had a surface area of about 3.5–4 acres per pound, was intimately admixed with 56 grams of water and the resultant mixture, which was of a fine, moist, loamy consistency, was passed through the meat grinder as in Example 1 and 2. The grinding action exerted on the carbon black in passing through the meat grinder was somewhat greater in intensity than that of Example 2 and the extruded carbon black was a dry-appearing crumby mass. This crumbly mass was subjected to a pelleting operation as in the preceding examples, 19 grams of additional water being added during the pelleting operation to bring the total water to about 75 grams. The pelleting operation was continued until small, uniform beads were formed. These were dried in an oven at a temperature of 300° F. for about an hour and thereafter subjected to the compressibility test previously described. As in the preceding example, a control sample of pellets, prepared from identical carbon black without the preliminary working, was also prepared.

The pellets prepared from the black which had been subjected to the treatment of our present invention had a density of 40.5 pounds per cubic foot and a compressibility of 34%, while the control sample had a density of 37.5 pounds per cubic foot and a compressibility of 43.1%.

The pelleting operation used in each of the preceding examples consisted in placing the carbon black and additional water, where such was used, in a 400 cc. beaker and stirring it violently by means of a mechanical agitator, operating at a speed such that the carbon black, and eventually the beads as formed, were in a continuous state of agitation.

As previously indicated herein, a substantial proportion of water should be admixed with the furnace black when subjected to the shearing action under pressure. We have usually found that if the proportion of water used be less than about one-half the weight of the dry carbon black, the shearing action under pressure results in the development of flakes which interfere with the final dispersion of the carbon black in rubber, for instance. We have further found that if the proportion of water exceeds about 1½ times the weight of the dry black, the desired effect of our preliminary treatment is not fully attained. The latter appears to be due to a cushioning action of the water which interferes with the high-pressure shearing which is essential to the accomplishment of the desired results.

Our present invention is not dependent upon the particular type of pelleting operation to which the black is subsequently subjected. It has been found to be especially useful as a preliminary step in the pelleting of furnace carbon blacks by the conventional so-called wet method, according to which the carbon black by various means is subjected to agitation or impact in a wet or moist condition.

By subjecting furnace carbons to the treatment of our present invention, one is enabled thereafter to convert finely divided furnace blacks by such conventional pelleting methods, without the use of a binder, into beads having the capacity to withstand shipment in bulk in tank car lots and handling by mechanical conveyors without material loss of their free-flowing characteristics.

We claim:

1. In the beading of carbon black of the furnace type, the step of subjecting the black to a preliminary treatment which comprises uniformly wetting the black with water in proportions within the range of from one-half to one and one-half times the dry weight of the black and such as to produce a moist loamy mass of such consistency that it will not flow under its own weight but will cohere when pressed, subjecting this mixture of black and water to shearing forces under pressure created by continuous grinding contact of extended surfaces to produce a crumbly mass, the subjection of the mixture of black and water to the shearing forces being of such duration that the compressibility of dried beads made therefrom is less than 30% by the test set forth in the specification and thereafter subjecting the carbon black to the beading operation.

2. In the beading of carbon black of the furnace type, the step of subjecting the black to a preliminary treatment which comprises uniformly wetting the black with water in proportions within the range of from one-half to one and one-half times the dry weight of the black and such as to produce a moist loamy mass of such consistency that it will not flow under its own weight but will cohere when pressed, subjecting this mixture of black and water to shearing forces under pressure created by continuous grinding contact of extended surfaces in a screw-type extrusion device to produce a crumbly mass of extruded black of increased density, the shearing forces being continued until the compressibility of dried beads made from the resulting black is less than 30% by the test set forth in the specification and thereafter subjecting the carbon black to the beading operation.

WILLIAM BRYAN WIEGAND.
CARL WILLIAM SWEITZER.

REFERENCES CITED

The following references are of record in the file of this patent:

UNITED STATES PATENTS

| Number | Name | Date |
|---|---|---|
| 2,040,770 | Grote | May 12, 1936 |
| 2,228,704 | Offutt | Jan. 14, 1941 |
| 2,283,364 | Hanson et al. | May 19, 1942 |
| 2,288,087 | Hanson et al. | June 30, 1942 |